(No Model.)

6 Sheets—Sheet 1.

A. W. CASH.
MACHINE FOR CUTTING DIES, TAPS, &c,

No. 454,029. Patented June 16, 1891.

Witnesses
Inventor
Arthur W. Cash.
by his attorney
J. H. Hubbard (No Model.) 6 Sheets—Sheet 3.

A. W. CASH.
MACHINE FOR CUTTING DIES, TAPS, &c,

No. 454,029. Patented June 16, 1891.

Witnesses
Wm. J. Tanner
A. J. Tanner

Inventor
Arthur W. Cash.
by his attorney
J. H. Hubbard (No Model.) 6 Sheets—Sheet 4.
A. W. CASH.
MACHINE FOR CUTTING DIES, TAPS, &c,
No. 454,029. Patented June 16, 1891.
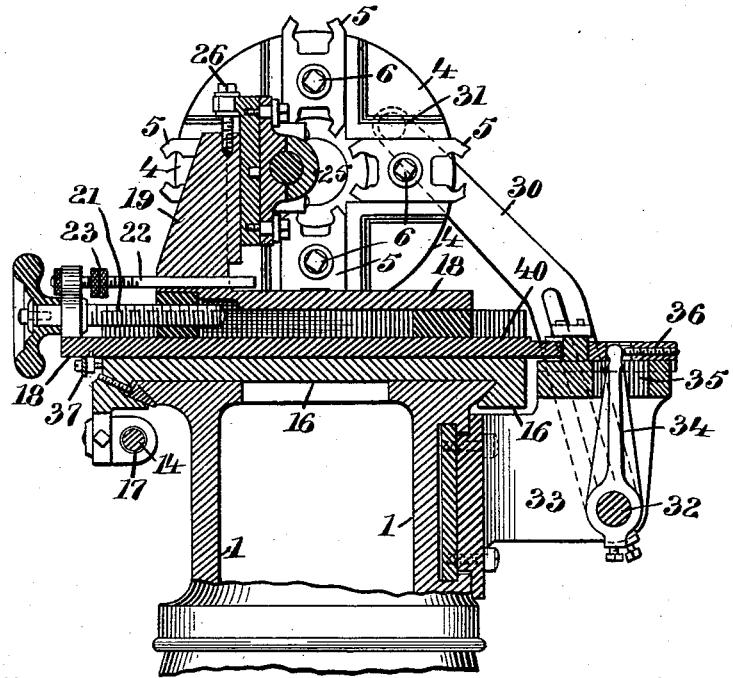
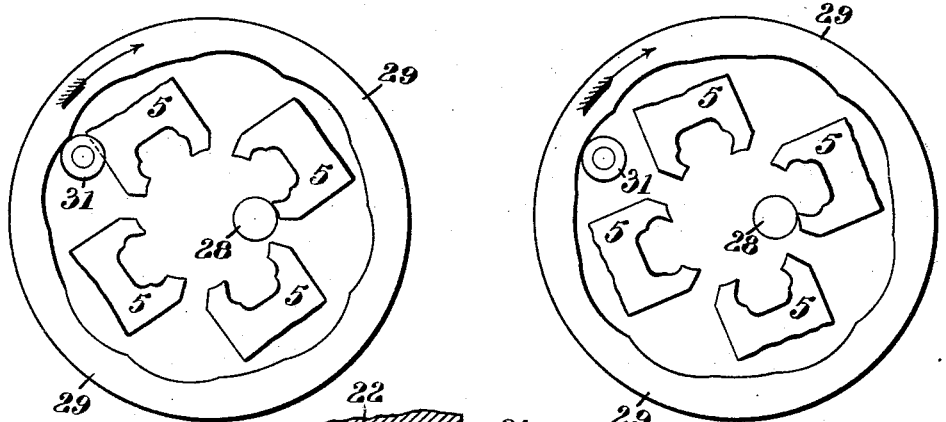
Witnesses
Inventor
Arthur W. Cash
by his attorney
J. H. Hubbard

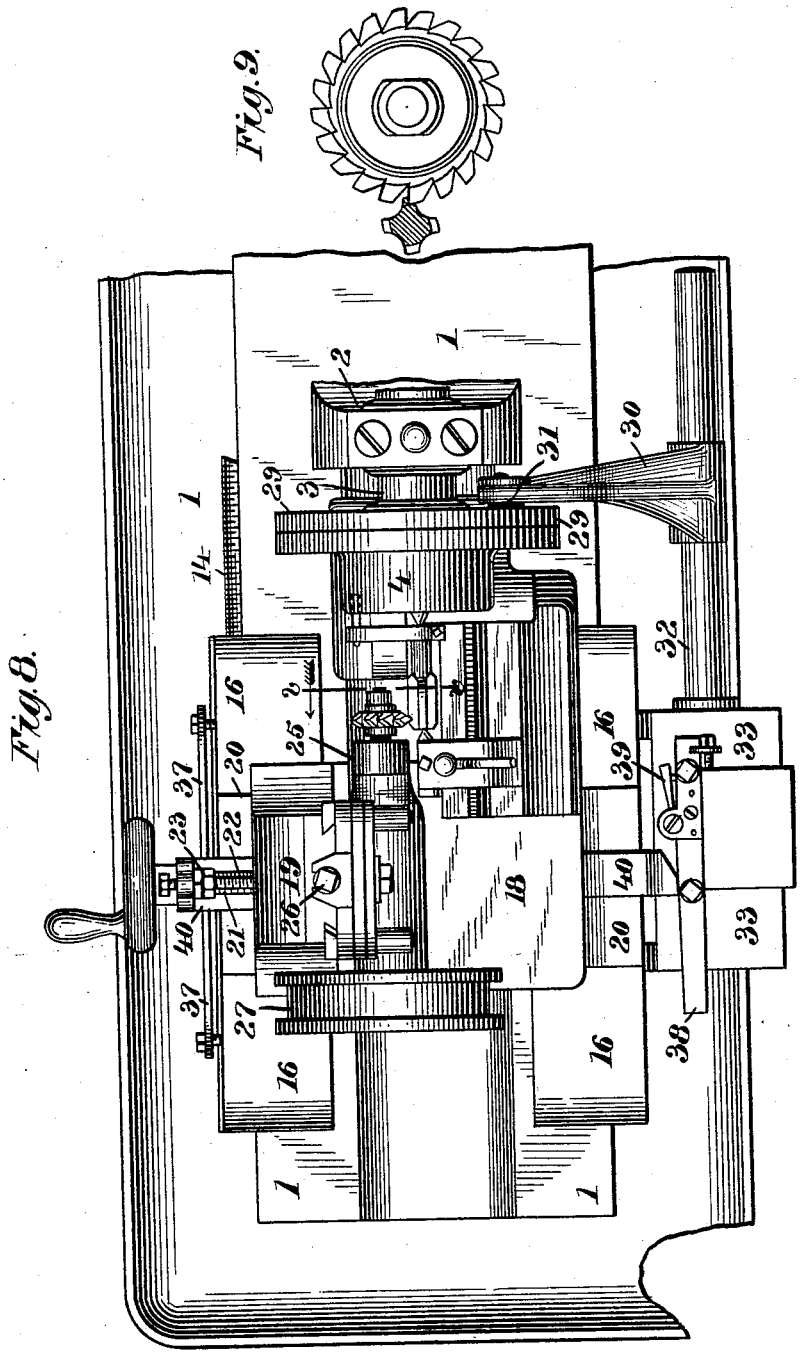

(No Model.) 6 Sheets—Sheet 6.

A. W. CASH.
MACHINE FOR CUTTING DIES, TAPS, &c,

No. 454,029. Patented June 16, 1891.

Witnesses

Inventor
Arthur W. Cash
by his attorney
J. H. Hubbard

UNITED STATES PATENT OFFICE.

ARTHUR W. CASH, OF BRIDGEPORT, CONNECTICUT, ASSIGNOR TO THE ARMSTRONG MANUFACTURING COMPANY, OF SAME PLACE.

MACHINE FOR CUTTING DIES, TAPS, &c.

SPECIFICATION forming part of Letters Patent No. 454,029, dated June 16, 1891.

Application filed November 1, 1890. Serial No. 370,067. (No model.)

*To all whom it may concern:*

Be it known that I, ARTHUR WISE CASH, a citizen of the United States, residing at Bridgeport, in the county of Fairfield and State of Connecticut, have invented certain new and useful Improvements in Machines for Cutting Dies, Taps, &c.; and I do hereby declare the following to be a full, clear, and exact description of the invention, such as will enable others skilled in the art to which it appertains to make and use the same.

This invention relates to certain new and useful improvements in machines for forming the cutting-faces upon dies, taps, mills, and similar tools, and the objects of this invention are to provide means for automatically feeding the cutter into engagement with the work and for insuring the accuracy of the finished dies or tap faces; but principally it has for its object to cause the cutter to so move relative to the work that the cutting-faces left upon the latter shall be relieved. By "relieving" these cutting-faces is meant the formation thereof in a curved line, which, while it may be a part of a true circle, is eccentric to the center about which the dies will revolve when in operation, as in threading the end of a pipe or bar. A die thus relieved cuts a much cleaner thread and cuts it with less friction than a die whose cutting-faces are concentric with the tube or pipe upon which they are designed to operate.

With the ends hereinbefore set forth in view my invention consists in the construction and combination of elements hereinafter fully explained, and then recited in the claims.

In order that those skilled in the art to which my invention appertains may fully understand its construction and operation, I will describe the same in detail, reference being had to the accompanying drawings, which form a part of this specification, and in which—

Figure 1:
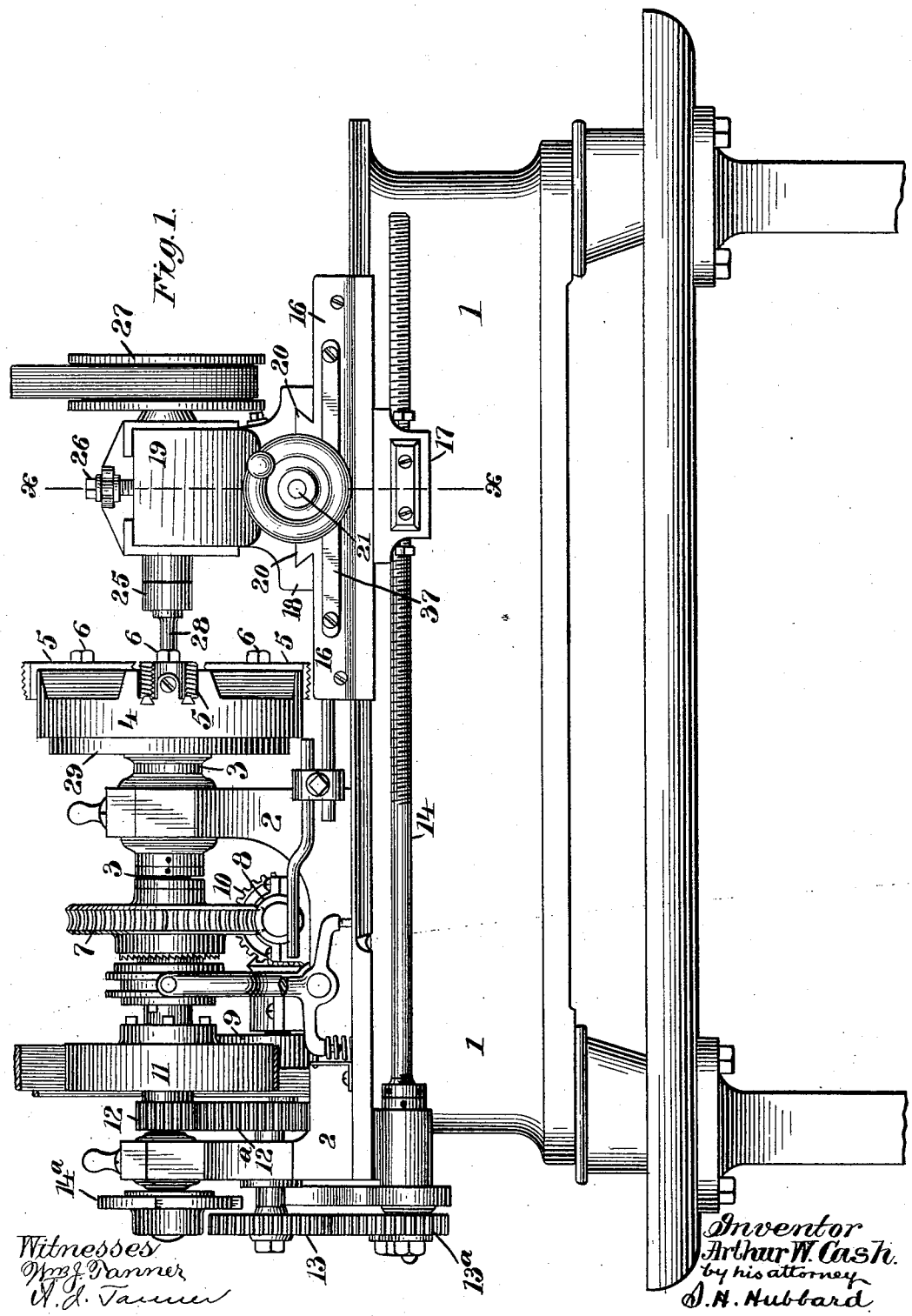
Figure 2:
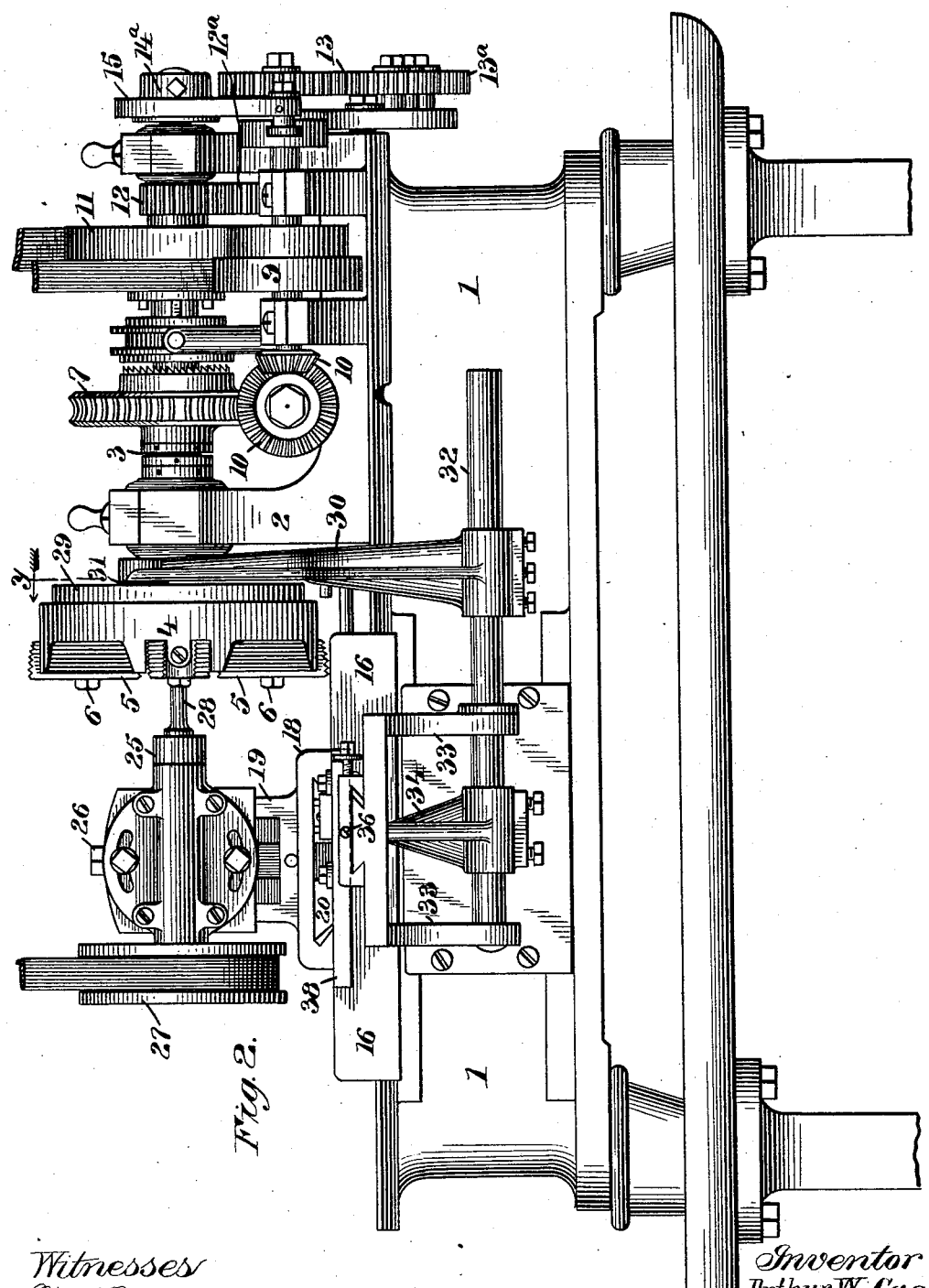
Figure 3:
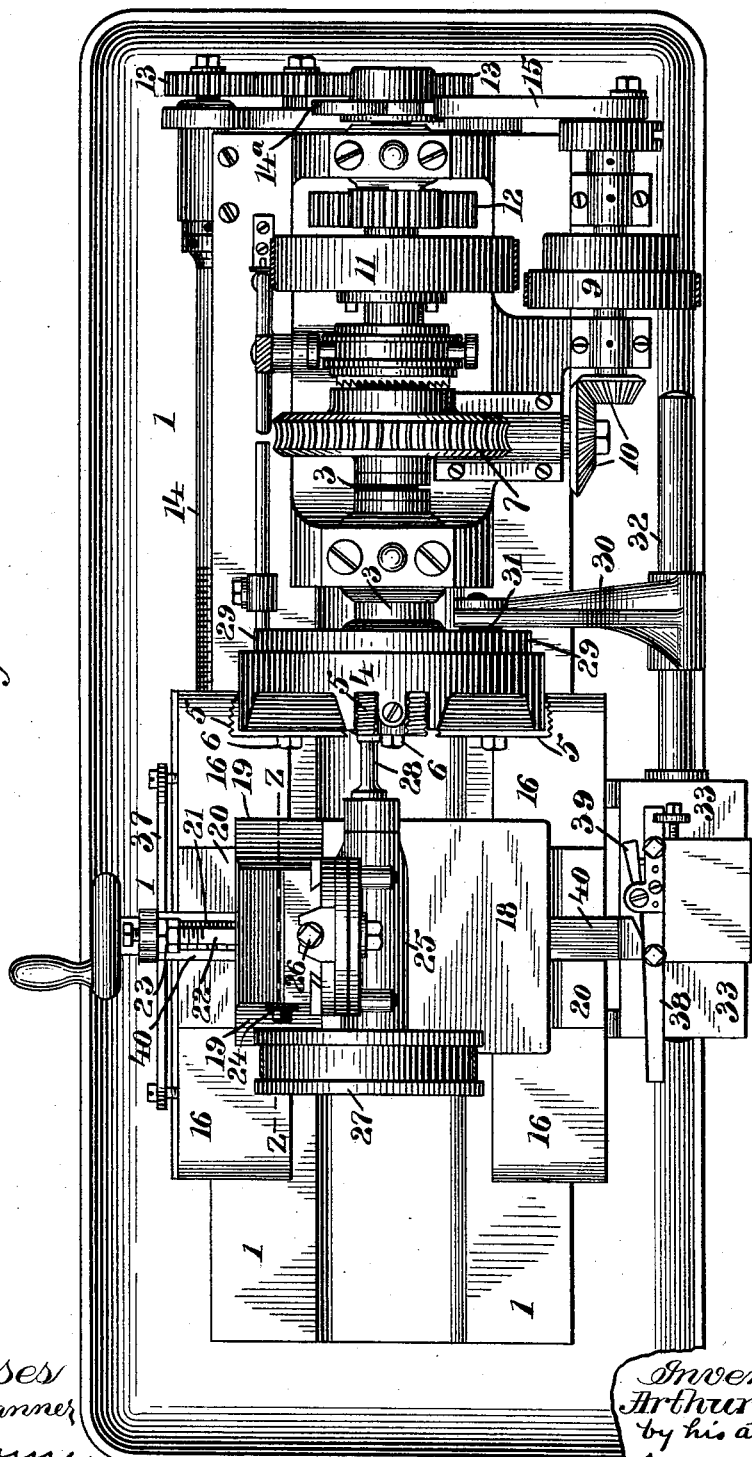
Figure 10:
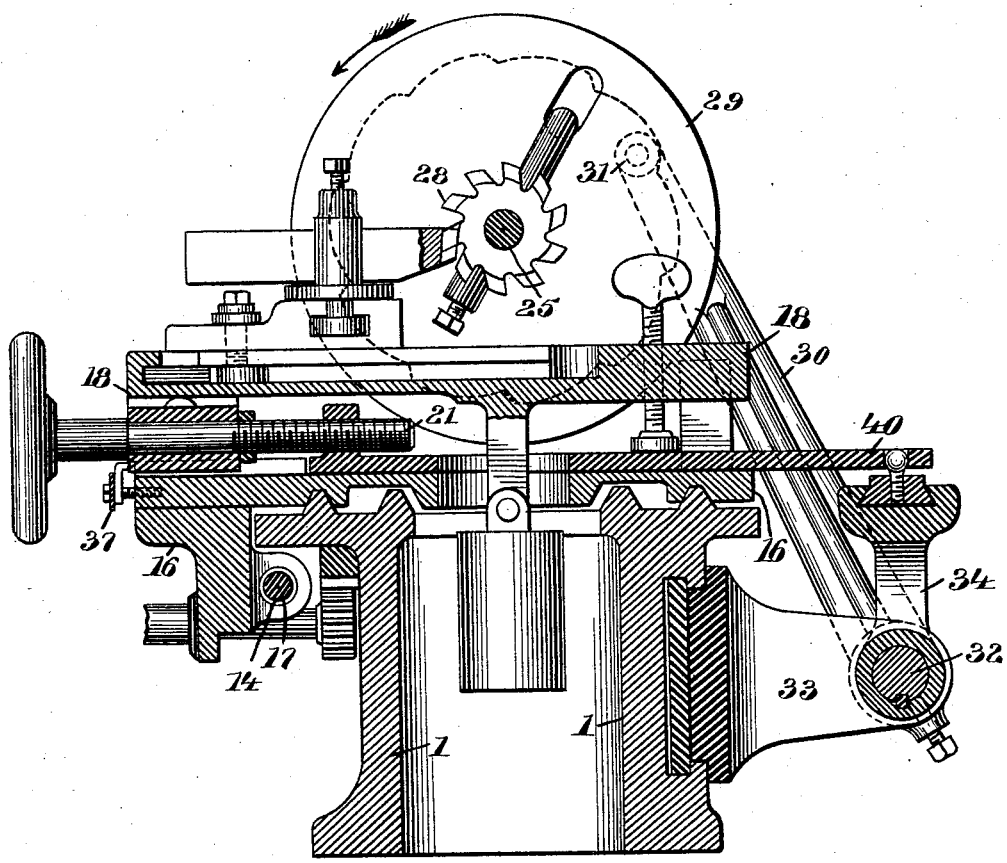

Figure 1 is a side elevation of my machine; Fig. 2, a similar view from the other side; Fig. 3, a plan view; Fig. 4, a vertical section at the line $x\ x$ of Fig. 1. Figs. 5 and 6 are elevations of the pattern-ring, but showing in diagram the positions of the dies, the cutter, and the roll upon which the pattern-ring operates. These two figures correctly represent the positions of the several parts as they would appear if one could look through the machine from the line $y\ y$ of Fig. 2 in the direction of the arrow; Fig. 7, a section on the line $z\ z$ of Fig. 3; Fig. 8, a plan view of a machine similar to that of the preceding Fig. 3, but adapted for producing taps; Fig. 9, a section on the line $v\ v$ of Fig. 8, somewhat enlarged; Fig. 10, a transverse section showing the application of my invention to a lathe, the latter being shown as in use for producing milling-cutters.

Like numerals denote the same parts in all the figures.

Referring now particularly to Figs. 1, 2, and 3, 1 is the supporting-bed or frame-work adapted to carry the moving parts of the machine.

Journaled in an upright or standard 2 is a shaft 3, provided with a head 4, said head adapted for the attachment of the die-blanks 5, whose faces it is desired to form in such manner that when mounted in a suitable stock they shall properly co-operate to cut a thread upon a pipe or bar. These blanks are shown at Fig. 4, and are attached to the head by means of screws 6. Behind the standard 2 a worm-wheel 7 is carried upon the shaft 3, and said worm-wheel is driven by means of a worm-gear 8, journaled transversely in bearings on the bed beneath said worm-wheel, said worm-gear being in its turn driven from a band-pulley 9 at one side of the bed, through the medium of a pair of beveled gears 10. 11 is a band-wheel journaled about the shaft 3. This band-wheel has nothing to do with the working of the machine, except to back off the cutter, so as to begin a new operation.

In front of the band-wheel 11 will be observed a toothed clutch, and at the rear of said band-wheel a ratchet-wheel 14ª, upon whose periphery a pawl 15 is operated by the shaft that carries the band-wheel 9. I have shown these parts because they are intimately associated with the other parts of the completed machine; but they form no part of my present invention, being substantially identical with the invention which is shown and described in Letters Patent of the United States No. 330,174, granted to Nathaniel W. Vandegrift, November 10, 1885. As the construction in this machine is substantially the same as in said patent and the purposes identical, I have deemed it unnecessary to describe it in detail. The rear extremity of the shaft 3 carries a gear 12, which, through gears 12ª, 13, and 13ª, imparts rotary movement to the feeding-screw 14, which is hung in bearings along the side of the frame.

16 is a carriage mounted upon the bed and adapted to be fed longitudinally thereon by means of the feed-screw 14, which passes through a projection upon said carriage, which is marked 17 at Fig. 4. This carriage supports a sliding plate 18, upon which is mounted a head 19, adapted to be moved upon ways 20 by means of a feeding-screw 21, whose operation is supplemented by a rod 22 and check-nuts 23, these latter being for the purpose of fine and close adjustment and for limiting the movement. As shown at Fig. 7, a binding-screw 24 abuts against the rod 22, for the purpose of securing the head rigidly in position when finally adjusted.

25 is an arbor journaled longitudinally in the head 19. It is adjustable vertically by means of any ordinary screw mechanism, such as shown at 26, and upon its rear end it carries a band-wheel 27. The forward end of this arbor is adapted to receive and carry the milling-cutter 38, by means of which the cutting-faces are formed upon the dies.

The mechanism heretofore described is competent to produce finished and properly-threaded dies; but said dies will have their cutting-surfaces concentric, which, as heretofore explained, is undesirable. I will now explain that portion of my machine by means of which the relieving is accomplished.

29 is a ring which is detachably secured upon the rear of the head 4, by any suitable means. The interior conformation of this ring is shown at Figs. 5 and 6, and it consists of an irregular line made up of a plurality of curves, each of which is preferably a part of a true circle, but no two of which are struck from the same center. This makes the interior contour of the ring a series of cam-surfaces.

30 is a lever (see Figs. 2, 3, and 4) whose upper extremity carries a roll 31, which latter projects into the ring from the rear and is adapted to rest against and to be moved slightly by the irregular outline of the latter. The lower end of this lever 30 embraces and is secured upon a rock-shaft 32, whose journal-bearings are in an outwardly-extending bracket 33, as shown at Fig. 4. 34 is a rock arm or lever, likewise made fast upon the shaft 32 and extending upward through an opening 35 in the bracket 33. The upper end of this lever engages a mortise in the slide-plate 18, and a set-screw 36 takes up lost motion between the end of said lever and the plate.

37 is a flat steel spring whose extremities are secured to the face of the carriage 16, as seen at Figs. 1 and 3, a projection from the edge of said spring taking into the bottom of the carriage 18, as seen at Fig. 4, so that any movement of the plate 18 toward the left of Fig. 4 will be made against the power of the spring, which latter will tend to restore it to its normal position when the applied force is removed.

Secured upon the bracket 33 is a tapered bar 38, which is held thereon by means of screws, bolts, or other suitable fastenings. 39 is a similar bar, which is arranged so as to form a continuation of the inner surface of the bar 38, but at an obtuse angle to the latter. The inner surface of these two bars are engaged by the extremity of a projecting shoe or rod 40, which is attached to or forms a part of the plate 18. The purpose of this arrangement is to give to the cutting-surface of the dies when finished not only the very gradual taper appropriate to a well-formed threading-die, but also to impart to said cutting-surfaces at one end a sharp taper, whereby the rod or pipe to be threaded may be readily introduced between the dies.

The operation of my invention is as follows: The blanks upon which the cutting-faces are to be formed are first secured to the outer surface of the head, as shown at Fig. 4. The carriage 16 is then run back upon the screw 14 until the milling-tool is in position to commence cutting, and then by means of the screw 21 the head 19 is properly adjusted transversely of the machine. The cutting-tool is then started, and likewise the head 4, which rotates very slowly, except during such times as it is advanced with a quick motion over the blank spaces between the points of the dies, as is fully set forth in the Letters Patent to Vandegrift heretofore referred to; but this rapid movement has nothing to do with my present invention, since it is done merely for the purpose of saving time. As will be observed by Figs. 5 and 6, the milling-cutter first comes in contact with the heel or rear end of the cutting-face. When it comes in contact with the first die-point, the roll upon the lever 30 is upon a high point of one of the cam-surfaces on the ring. (See Fig. 5.) This, by means of the rock-shaft 32 and the lever 34, has crowded the plate 18 toward the left of Fig. 4, so that the bite of the milling-cutter takes into the stock of the blank to a considerable depth. This will be understood by reference to Fig. 5, where the position of the milling-cutter and the position of the ring and roll on the lever appropriate to produce this position of the milling-cutter are shown in diagram. Of course it is understood that the transverse movement of the plate 18 is made against the spring 37, which tends constantly to throw the plate in the opposite direction toward its normal position. As the ring and the die-blanks revolve still farther in the direction of the arrow, as appears in Figs. 5 and 6, the roll on the lever descends from the high point of the cam which caused it to bite deeply, and as the spring 37 crowds the plate and its attached parts backward the bite of the cutter becomes less and less until at the extreme point of the cutting-face it is at its least depth, as seen at Fig. 6, at which time the roll is in contact with a low portion of the cam-surface of the ring. When the head carrying the ring and dies has further advanced so that the cutter arrives at the next point of the blank, the roll will be again at a high point and will therefore begin its cut with a bite of greatest depth, by reason, as heretofore explain, of. the fact that the plate 18 and the cutter are crowded over against the spring to the greatest distance— that is, toward the left of Fig. 4. As the movement of the head and ring is very slow, the to-and-fro traverse of the cutter is very gradual as well as very slight, and the movement of the outer end of the lever 30 is reduced in the movement of the cutter by reason of the discrepancy in length between said lever 30 and the lever 34.

In addition to the relieving of the die-faces which has just been described, it is necessary to impart to the cutting-surface of the die not only the very gradual straight taper of its face, but also the somewhat sharper taper, by means of which the ready insertion of the work is permitted. This is accomplished by means of the two guiding-bars 38 and 39, which act upon the plate 18, so as to steadily and gradually carry the cutter more deeply against the work as the cut advances. When the cut is commenced, the carriage of course is at its extreme position at the right of Fig. 1. The shoe 40 will therefore be at the lowest point of the inclined bar 38. As said carriage 16 is fed forward toward the left of Fig. 1 by means of the screw 14, it will be readily understood that the action of the shoe against the inclined surface of the bar will gradually crowd the plate 18 more and more toward the left of Fig. 4, thereby forming a straight taper on the surface of the die. When the carriage 16 has been fed forward by the screw 14 far enough so that the shoe arrives at the sharper incline of the inner surface of the bar 39, the same crowding movement still continues, but more rapidly, whereby the last end to be cut will be considerably deeper, so that the dies when in operation may readily receive the work.

In Figs. 8 and 9 is shown a machine precisely similar to that in the preceding figures, except that the head 4 is arranged to accommodate a tap instead of a plurality of dies, said tap being hung in bearings and held as against rotation independent of the head by means of an ordinary dog or other suitable device. As this is identical in principle it would appear that no further or more detailed explanation is necessary.

In Fig. 10 I have shown the cross-slide of the preceding figures applied to a lathe, the turning-tool of which is shown as relieving the cutting-face of a circular mill in substantially the same manner as has heretofore described—that is to say, the mill being rotated against the turning-tool, which latter has imparted thereto by means of the cam 29 a sliding movement toward and away from the work.

In this my invention I do not wish to be confined to the exact details of construction herein shown and described, since it is apparent that the method of operation which forms the gist of my invention may be applied in various ways, either to lathes or other machines, without departing from the combinations recited in the clauses of claims now to follow.

I claim—

1. In a machine of the character described, the combination, with the rotative head and means for attaching the blanks thereto, and the milling-cutter, of a cam and the connection between said cam and the milling-cutter, whereby the latter, in addition to its other appropriate movements, shall have a traversing motion, substantially as described.

2. In a machine as described, the combination, with a rotative head and means for securing the die-blanks thereon, of the milling-cutter, the means for feeding the same longitudinally, a traversable plate upon which said cutter is mounted, and a pattern-cam, and the connection between said cam and the cutter-plate, whereby the latter receives a to-and-fro movement transversely to the length of the machine, substantially as described.

3. The combination, with a rotative head, of the cam-ring carried thereby, the rotative cutter and its traversable carriage, and the means, as levers, interposed between said cam ring and the carriage, whereby the latter is given a to-and-fro movement at right angles to its forward feeding movement, substantially as described.

4. In a machine of the character described, the combination, with a rotative head adapted to carry the die-blanks, of the cam carried by said head, a rock-lever obtaining movement from said cam, a traversable tool-carrier, and the connection between the cam-operated lever and said tool-carrier, whereby the latter has imparted thereto a movement transverse to the length of the machine, substantially as described.

5. In a machine as described, the combination, with the rotative head adapted to carry the die-blanks, of the leverage system comprising the parts 30, 32, and 34, the traversable tool-carrying plate engaged by the lever 34, and a spring engaging the other end of said plate, substantially as described.

6. In a machine of the character described, the combination, with the rotating head adapted to carry the blanks and the milling-cutter, of a pattern-cam connected with the head, and the power-transmitting devices interposed between said cam and the milling-cutter, whereby the contour of the former governs the movement of the latter, substantially as described.

7. In a machine as described, the combination, with the rotative head adapted to carry the die-blanks, of the milling-cutter having longitudinal movement toward and away from the head, a traversable plate upon which said cutter is mounted, a pattern-cam, and the means, as described, interposed between the cam and the cutter-plate and having operative engagement with each, whereby said plate and its cutter are traversed relative to the work, substantially as set forth.

In testimony whereof I affix my signature in presence of two witnesses.

ARTHUR W. CASH.

Witnesses:
H. E. FRENCH,
NETTIE S. WELLS.